United States Patent
Van Houtum et al.

(10) Patent No.: US 7,103,061 B1
(45) Date of Patent: Sep. 5, 2006

(54) SYNCHRONIZATION CODEWORD FOR INTERFERENCE REDUCTION IN A CDMA SYSTEM

(75) Inventors: Wilhelmus Johannes Van Houtum, Eindhoven (NL); Carel Jan Leendert Van Driel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 850 days.

(21) Appl. No.: 09/763,843

(22) PCT Filed: Jun. 26, 2000

(86) PCT No.: PCT/EP00/05906

§ 371 (c)(1),
(2), (4) Date: Feb. 27, 2001

(87) PCT Pub. No.: WO01/01593

PCT Pub. Date: Jan. 4, 2001

(51) Int. Cl.
*H04B 7/216* (2006.01)

(52) U.S. Cl. .................. 370/441; 370/310.2; 370/328; 370/335; 370/342; 375/130; 375/140; 375/145; 375/354; 375/142; 375/149; 375/150

(58) Field of Classification Search ............... 370/310, 370/310.2, 431, 441, 328, 331–334, 335, 370/342; 375/130, 140, 145, 354, 356, 142, 375/149, 150
See application file for complete search history.

(56) References Cited

U.S. PATENT DOCUMENTS

| | | | | |
|---|---|---|---|---|
| 5,499,236 A | * | 3/1996 | Giallorenzi et al. | 370/441 |
| 5,583,853 A | * | 12/1996 | Giallorenzi et al. | 370/441 |
| 6,332,008 B1 | * | 12/2001 | Giallorenzi et al. | 375/356 |
| 6,526,091 B1 | * | 2/2003 | Nystrom et al. | 375/142 |

* cited by examiner

*Primary Examiner*—Chi Pham
*Assistant Examiner*—Raj Jain

(57) ABSTRACT

The CDMA communication system according to the invention comprises at least one primary station (2) and a plurality of secondary stations (4). The primary station (2) and the secondary stations (4) can exchange CDMA signals (18) via a communication medium (6). The secondary stations (4) each comprise a modulator (10) for modulating data signals (16) with code words (14) in order to obtain the CDMA signals (18). A modulator (10) of a secondary station (4) initially modulates its data signal (16) with an initial code word until that secondary station (4) is synchronized with the primary station (2). From that moment on the data signal (16) is modulated with a final code word. Ideally, an initial code word is used which is, for every possible time shift of that code, substantially orthogonal to all the final code words in use by the already synchronized secondary stations (4). Such an initial code word does not interfere with the CDMA signals (18) received and transmitted by the already synchronized secondary stations (4) and is therefore very well suited for the purpose of synchronizing a secondary station (4) with the primary station (2). If Walsh-Hadamard codes are used as code words the code word corresponding to the first row of the Walsh-Hadamard matrix is an example of such an ideal initial code word.

9 Claims, 2 Drawing Sheets

FIG. 3

Figure 1:
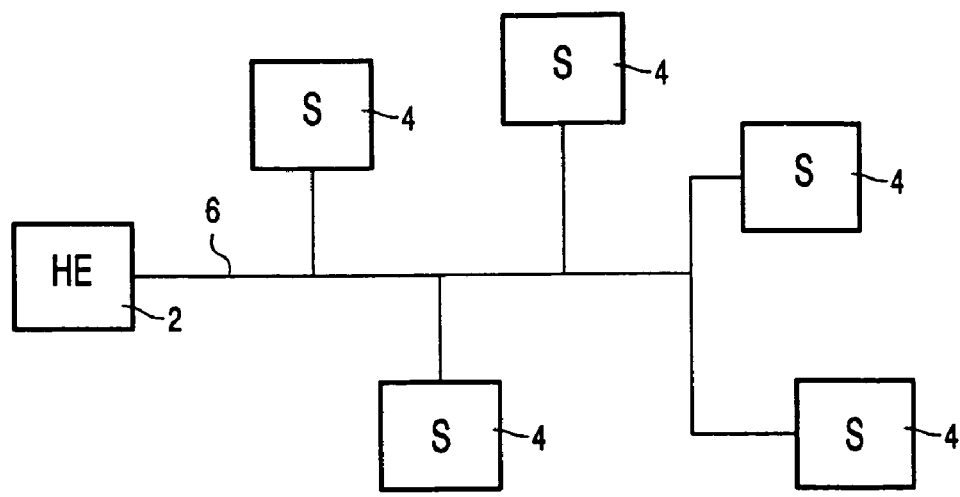

|   | R0 | R1 | R2 | R3 | R4 | R5 | R6 | R7 | R8 | R9 | R10 | R11 | R12 | R13 | R14 | R15 |
|---|---|---|---|---|---|---|---|---|---|---|---|---|---|---|---|---|
| C15 | 0 | 1 | 1 | 0 | 1 | 0 | 0 | 1 | 1 | 0 | 0 | 1 | 0 | 1 | 1 | 0 |
| C14 | 0 | 0 | 1 | 1 | 0 | 1 | 0 | 0 | 1 | 1 | 0 | 0 | 0 | 0 | 1 | 1 |
| C13 | 0 | 1 | 0 | 1 | 1 | 0 | 1 | 0 | 1 | 0 | 1 | 0 | 0 | 1 | 0 | 1 |
| C12 | 0 | 0 | 0 | 0 | 1 | 1 | 1 | 1 | 1 | 1 | 1 | 1 | 0 | 0 | 0 | 0 |
| C11 | 0 | 1 | 1 | 0 | 0 | 1 | 1 | 0 | 1 | 0 | 0 | 1 | 1 | 0 | 0 | 1 |
| C10 | 0 | 0 | 1 | 1 | 0 | 0 | 1 | 1 | 1 | 1 | 0 | 0 | 1 | 1 | 0 | 0 |
| C9  | 0 | 1 | 0 | 1 | 0 | 1 | 0 | 1 | 1 | 0 | 1 | 0 | 1 | 0 | 1 | 0 |
| C8  | 0 | 0 | 0 | 0 | 0 | 0 | 0 | 0 | 1 | 1 | 1 | 1 | 1 | 1 | 1 | 1 |
| C7  | 0 | 1 | 1 | 0 | 1 | 0 | 0 | 1 | 0 | 1 | 1 | 0 | 1 | 0 | 0 | 1 |
| C6  | 0 | 0 | 1 | 1 | 1 | 1 | 0 | 0 | 0 | 0 | 1 | 1 | 1 | 1 | 0 | 0 |
| C5  | 0 | 1 | 0 | 1 | 1 | 0 | 1 | 0 | 0 | 1 | 0 | 1 | 1 | 0 | 1 | 0 |
| C4  | 0 | 0 | 0 | 0 | 1 | 1 | 1 | 1 | 0 | 0 | 0 | 0 | 1 | 1 | 1 | 1 |
| C3  | 0 | 1 | 1 | 0 | 0 | 1 | 1 | 0 | 0 | 1 | 1 | 0 | 0 | 1 | 1 | 0 |
| C2  | 0 | 0 | 1 | 1 | 0 | 0 | 1 | 1 | 0 | 0 | 1 | 1 | 0 | 0 | 1 | 1 |
| C1  | 0 | 1 | 0 | 1 | 0 | 1 | 0 | 1 | 0 | 1 | 0 | 1 | 0 | 1 | 0 | 1 |
| C0  | 0 | 0 | 0 | 0 | 0 | 0 | 0 | 0 | 0 | 0 | 0 | 0 | 0 | 0 | 0 | 0 |

SYNCHRONIZATION CODEWORD FOR INTERFERENCE REDUCTION IN A CDMA SYSTEM

The invention relates to a CDMA communication system comprising at least one primary station and a plurality of secondary stations, the primary station and the secondary stations exchanging CDMA signals via a communication medium, the secondary stations each comprising a modulator for modulating a respective data signal with a respective code word in order to obtain a respective CDMA signal, the modulator being embodied so as to modulate the respective data signal with an initial code word until synchronisation with the primary station is obtained, the modulator being further embodied so as to modulate the respective data signal with a respective final code word after synchronisation with the primary station has been obtained.

The invention further relates to a secondary station for exchanging CDMA signals via a communication medium with at least one primary station and to a method of synchronising a secondary station with a primary station.

A CDMA communication system according to the preamble is known from U.S. Pat. No. 5,499,236. Code Division Multiple Access (CDMA) is a multiplexing technique which permits a number of users to simultaneously access a transmission channel. For this purpose a data signal to be transmitted is modulated with a code word, i.e. a pseudo-random binary sequence, in order to spread the spectrum of the waveform. In a receiver the original data signal can be detected by correlating the received CDMA signal with the corresponding code word. This correlation despreads the spectrum. Other CDMA signals are not despread by the correlator because their code words do not match. CDMA can be used, for example, in mobile communication systems and in interactive cable television networks.

The system capacity, i.e. the total sum of the bit rates of the users, of a synchronised CDMA communication system is limited by the maximum number of different code words, whereas the system capacity of an asynchronous CDMA communication system is limited by the interference noise. Hence, the system capacity of a synchronised CDMA communication system is generally much higher than that of an asynchronous CDMA communication system.

In the known synchronised CDMA communication system all secondary stations which are not yet synchronised with the primary station and which want to transmit data to that primary station use the same initial code word to modulate their data signals with. Next, the resulting asynchronous CDMA signals are transmitted to the primary station. The primary station then determines for each secondary station the timing difference between the received CDMA signal and a reference clock and transmits this timing difference to each particular secondary station. Next, the secondary stations can synchronise with the primary station by time shifting the initial code word in accordance with the received timing differences. This process is repeated for each secondary station until synchronisation is obtained, after which a different final code word is used by each secondary station to modulate its data signal with.

In the known CDMA communication system the asynchronous use of the initial code word may cause interference with the CDMA signals received and transmitted by the already synchronised secondary stations.

An object of the invention is to provide a CDMA communication system, wherein the asynchronous use of the initial code word does not cause interference with the CDMA signals received and transmitted by the already synchronised secondary stations. This object is achieved in the CDMA communication system according to the invention, which is characterized in that the initial code word is substantially orthogonal to the final code words for every possible time shift of the initial code word. The invention is based upon the recognition that such an initial code word does not interfere with the CDMA signals received and transmitted by the already synchronised secondary stations and is therefore very well suited for the purpose of synchronising a secondary station with the primary station.

A first embodiment of the CDMA communication system according to the invention is characterized in that all symbol values of the initial code word are equal to each other. If all symbol values of an initial code word are equal to each other, that initial code word remains the same for every possible time shift of that initial code word. Hence, a time shift of that initial code word does not influence the orthogonality of that initial code word relative to the final code words.

A second embodiment of the CDMA communication system according to the invention is characterized in that the code words are Walsh-Hadamard codes and that the initial code word corresponds to the first row or the first column of the Walsh-Hadamard matrix. Walsh-Hadamard code words have ideal cross correlation properties because all the Walsh-Hadamard code words are mutually orthogonal. The system capacity of a synchronised CDMA communication system can be further increased by using Walsh-Hadamard code words. If Walsh-Hadamard codes are used as code words the code corresponding to the first row or the first column of the Walsh-Hadamard matrix is an ideal initial code word as it is, for every possible time shift of that code, substantially orthogonal to all the final Walsh-Hadamard code words in use by the already synchronised secondary stations.

Figure 2:
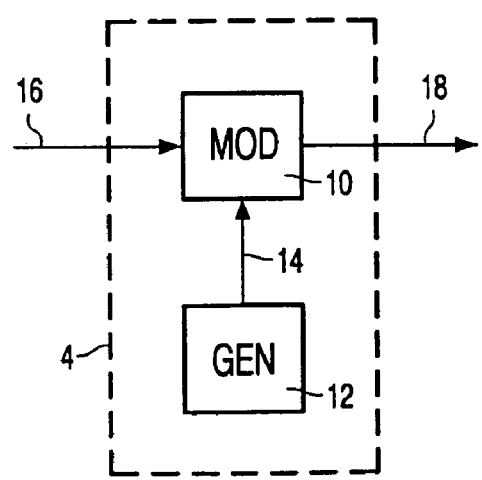

The above object and features of the present invention will be more apparent from the following description of the preferred embodiments with reference to the drawings, wherein:

FIG. 1 shows a block diagram of an embodiment of a CDMA communication system according to the invention, FIG. 2 shows a block diagram of part of an embodiment of a secondary station, FIG. 3 shows a Walsh-Hadamard matrix $H_4$.

FIG. 1 shows a block diagram of an embodiment of a CDMA communication system according to the invention. In such a CDMA communication system CDMA signals are exchanged via a communication medium 6 between a number of stations 2 and 4. These CDMA communication stations 2 and 4 comprise at least one primary station 2, which is here a head end, and a plurality of secondary stations 4. The CDMA communication system, which may comprise further primary stations 2 and secondary stations 4, is a partly synchronised CDMA communication system. This means that some of the secondary stations 4 are synchronised to the primary station 2, while other secondary stations 4 are not yet synchronised to the primary station 2.

FIG. 2 shows a block diagram of a part of a secondary station 4. The part that is shown is that relating to the modulation of an input data signal 16. Operational parameters of all blocks shown are controlled by a controller (not shown). The secondary stations 4 each comprise a modulator 10 for modulating the input data signals 16 with code words 14 in order to obtain the CDMA signals 18. These code words 14 may be generated by a generator 12. A modulator 10 of a secondary station 4 which is not yet synchronised to the primary station 2 initially modulates its data signal 16 with an initial code word 14 until that secondary station 4 is synchronised with the primary station 2. From that moment on the data signal 16 is modulated with a final code word 14.

Ideally, an initial code word 14 is used which is, for every possible time shift of that code, substantially orthogonal to all the final code words 14 in use by the already synchronised secondary stations 4. Such an initial code word does not interfere with the CDMA signals 18 received and transmitted by the already synchronised secondary stations 4 and is therefore very well suited for the purpose of synchronising a secondary station 4 with the primary station 2. Code words 14 which have symbol values which are all equal to each other are such ideal initial code words. If all symbol values of an initial code word are equal to each other, that initial code word remains the same for every possible time shift of that initial code word. Hence, a time shift of that initial code word does not influence the orthogonality of that initial code word relative to the final code words. If Walsh-Hadamard codes are used as code words 14 the code word corresponding to the first row or the first column of the Walsh-Hadamard matrix is a practical example of an ideal initial code word having symbol values which are all equal to each other.

FIG. 3 shows a Walsh-Hadamard matrix $H_4$. A Walsh-Hadamard matrix $H_n$ is defined inductively and can be calculated from a given Walsh-Hadamard matrix $H_1$. The rows $R_0 \ldots R_{2^n-1}$ and columns $C_0 \ldots C_{2^n-1}$ of a Walsh-Hadamard matrix $H_n$ are orthogonal. The code words 14 may be based on the rows $R_0 \ldots R_{2^n-1}$ or the columns $C_0 \ldots C_{2^n-1}$ of such a Walsh-Hadamard matrix $H_n$. A code word based upon the first row $R_0$ or the first column $C_0$ of the Walsh-Hadamard matrix $H_4$ (in general: of the Walsh-Hadamard matrix $H_n$) has symbol values which are all equal to each other.

The scope of the invention is not limited to the embodiments explicitly disclosed. The invention is embodied in each new characteristic and each combination of characteristics. Any reference signs do not limit the scope of the claims. The word "comprising" does not exclude the presence of other elements or steps than those listed in a claim. Use of the word "a" or "an" preceding an element does not exclude the presence of a plurality of such elements.

The invention claimed is:

1. A CDMA communication system comprising:
at least one primary station(2) and a plurality of secondary stations (4), the primary station (2) and the secondary stations (4) exchanging CDMA signals (18) via a communication medium (6), the secondary stations (4) each comprising:
a modulator (10) for modulating a respective data signal (16) with a respective code word (14) in order to obtain a respective CDMA signal (18), the modulator being embodied so as to modulate the respective data signal (16) with an initial code word until synchronization with the primary station (2) is obtained, the modulator (10) being further embodied so as to modulate the respective data signal (16) with a respective final code word after synchronization with the primary station (2) has been obtained, wherein the initial code word is substantially orthogonal to the final code words for every possible time shift of the initial code word.

2. The CDMA communication system according to claim 1, wherein all symbol values of the initial code word are equal to each other.

3. The CDMA communication system according to claim 1, wherein the code words (14) are Walsh-Hadamard codes and that the initial code word corresponds to the first row or the first column of the Walsh-Hadamard matrix.

4. A secondary station (4) for exchanging CDMA signals (18) via a communication medium (6) with at least one primary station (2), the secondary station (4) comprising:
a modulator (10) for modulating a data signal (16) with a code word (14) in order to obtain a CDMA signal (18), the modulator (10) being embodied so as to modulate the data signal (16) with an initial code word until synchronization with the primary station (2) is obtained, the modulator (10) being further embodied so as to modulate the data signal (16) with a final code word after synchronization with the primary station (3) has been obtained, wherein the initial code word is substantially orthogonal to the final code word for every possible time shift of the initial code word.

5. Previously presented) The secondary station (4) according to claim 4, wherein all symbol values of the initial code word are equal to each other.

6. The secondary station (4) according to claim 4 wherein the code words (14) are Walsh-Hadamard codes and that the initial code word corresponds to the first row or the first column of the Walsh-Hadamard matrix.

7. A method of synchronizing a secondary station (4) with a primary station (2), the primary station (2) and the secondary station (4) exchanging CDMA signals (18) via a communications medium (6), the method comprising the steps of:
modulating a data signal (16) with an initial code word (14) in order to obtain an initial CDMA signal (18) and transmitting the initial CDMA signal (18) to the primary station (2) until synchronization with the primary station (2) is obtained,
modulating the data (16) with a final code word (14) in order to obtain a final CDMA signal (18) and transmitting the final CDMA signal (18) after synchronization with the primary station (2) has been obtained,
wherein the initial code word is substantially orthogonal to the final code word for every possible time shift of the initial code word.

8. The method of synchronizing a secondary station (4) with a primary station (2) according to claim 7, wherein all symbol values of the initial code word are equal to each other.

9. The method of synchronizing a secondary station (4) with a primary station (2) according to claim 7 wherein the code words are Walsh-Hadamard codes and that the initial code word corresponds to the first row or the first column of the Walsh-Hadamard matrix.

\* \* \* \* \*